United States Patent Office 3,553,164
Patented Jan. 5, 1971

3,553,164
ORGANOSILICON RESIN COMPOSITIONS
James William Curry, Dallas, Tex., assignor to Texas Instruments Incorporated, Dallas, Tex., a corporation of Delaware
No Drawing. Filed July 31, 1968, Ser. No. 748,924
Int. Cl. C08f 11/04
U.S. Cl. 260—46.5    9 Claims

ABSTRACT OF THE DISCLOSURE

Organosilicon resin compositions having repeating structural units represented by the structural formula:

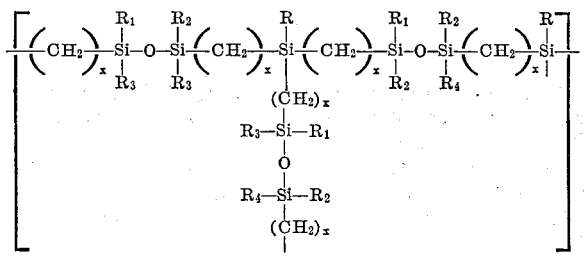

where R is selected from the group consisting of alkyls having from 1 to 30 carbon atoms, inclusive, cycloalkyls, aryls, arylalkyls, related ether containing organic groups, and carbalkoxy substituted derivatives thereof; $R_1$, $R_2$, $R_3$ and $R_4$ are each selected from the group consisting of alkyls having from 1 to 18 carbon atoms, inclusive, cycloalkyls, aryls, arylalkyls and the $x$ is an integer from 2 to 8, inclusive.

---

This invention relates to the chemistry of organosilicon compounds and more particularly to organosilicon resin compositions.

The organosilicon resin compositions of the present invention may be prepared by reacting a mono-organo, trihydrosilane represented by the formula:

(1) $RSiH_3$ with a dialkenyldisiloxane represented by the formula:

(2) 
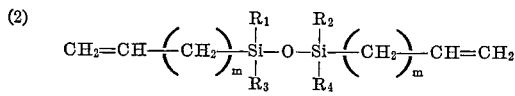

in the presence of a suitable hydrosilation catalyst such as chloroplatinic acid. The reaction is represented by the following equation:

(3)

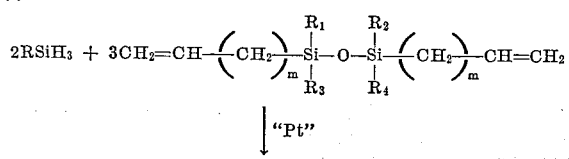

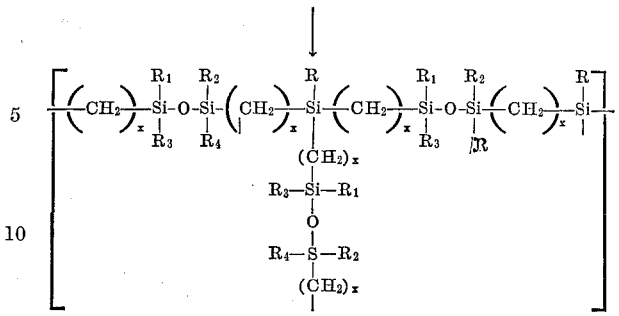

In Formulas 1 and 2 and Equation 3, R is selected from the group consisting of alkyls having from 1 to 30 carbon atoms, inclusive, cycloalkyls, aryls, arylalkyls, related ether containing organic groups, and carbalkoxy substituted derivatives thereof; $R_1$, $R_2$, $R_3$ and $R_4$ are each selected from the group consisting of alkyls having from 1 to 18 carbon atoms, inclusive, cycloalkyls, aryls, arylalkyls; $m$ is an integer from 0 to 6, inclusive; and $x$ is an integer from 2 to 8, inclusive. The "Pt" catalyst shown in the above reaction appears in quotation marks to show chloroplatinic acid, for example.

For a more detailed description of the conditions and quantities which may be employed, reference is made to the following examples. Examples I and II of which relate to the reaction of n-octadecylsilane with sym-tetramethyldivinyldisiloxane to produce an organosilicon resin and Example III of which relates to the reaction of phenylsilane with sym-tetramethyldivinyldisiloxane to produce an organosilicon resin.

EXAMPLE I

Into a reaction vessel containing 0.1 mole (28.5 grams) of n-octadecylsilane (n-$C_{18}H_{37}SiH_3$) were added several crystals of chloroplatinic acid ($H_2PtCl_6 \cdot 6H_2O$). The materials were mixed and permitted to stand overnight to permit the chloroplatinic acid and n-octadecylsilane to form a reactive coordination composition. The quantity of catalyst employed is preferably about $10^{-4}$ mole of chloroplatinic acid per mole of the silane, though the ratio may be as small as $10^{-5}$ to 1 or as high as $10^{-3}$ to 1.

To the chloroplatinic acid, n-octadecylsilane coordination complex was then added, with mixing, 0.15 mole (28.0 grams) of sym-tetramethyldivinyldisiloxane

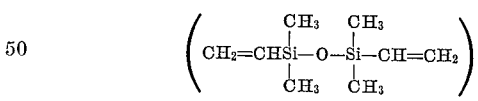

The mixture was heated for 24 hours. Temperature of the mixture during the 24-hour period varied between about 171° C. and 185° C. due to the heat generated by the reaction (3) above. The organosilicon resin formed in the reaction, which contains repeating structural units generally represented by the formula:

(4) 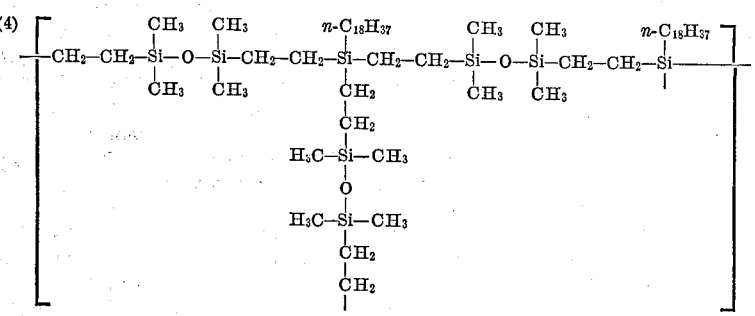

was removed from the reaction vessel treated with "Norit" (activated carbon) to lighten the color of the resin and filtered. During filtration, approximately 4.0 grams of the resin yield of 56.6 grams was retained in the sintered glass funnel used in the filtration. The filtrate was then heated to a temperature of 275° C. at a pressure of 0.02 mm. Hg to remove any low boiling constituents but none were present.

EXAMPLE II

Into a reaction vessel were placed 0.044 mole (12.5 grams) of n-octadecylsilane and 0.066 mole (12.3 grams) of sym-tetramethyldivinyldisiloxane. The contents of the vessel were mixed, following which 3 drops of an isopropanol solution which contained $1.0 \times 10^{-4}$ mole of chloroplatinic acid ($H_2PtCl_6.6H_2O$) per milliliter of isopropanol were added.

After addition of the chloroplatinic acid catalyst, the contents of the vessel were heated for a 24-hour period during which the temperature varied between 165° C. and 278° C. due to the heat being generated in the reaction. The resin produced in the reaction, which contained the repeating structural units of Formula 4 was treated with "Norit" (activated carbon) to lighten the color and filtered. During filtration 1.9 grams of the 21.9 gram yield was retained in the sintered glass funnel used in the filtration. The resin was then heated to 260° C. at a pressure of 0.05 mm. Hg to remove any low boiling constituents, but none were present.

EXAMPLE III

To a reaction vessel containing 0.1 mole (10.8 grams) phenylsilane ($C_6H_5SiH_3$) were added several crystals of crystalline chloroplatinic acid ($H_2PtCl_6.6H_2O$). As explained above, approximately $10^{-4}$ mole of the chloroplatinic acid per mole of the phenylsilane is used, though the ratio may vary between $10^{-5}$ to 1 and $10^{-3}$ to 1. The contents of the vessel, after mixing, were permitted to stand for approximately 2.5 hours. At the end of the 2.5 hour period, there were added to the vessel 0.15 mole (28.0 grams) of sym-tetramethyldivinyldisiloxane. The contents of the vessel, after mixing, were heated for a 24-hour period during which the temperature varied between 133.0° C. and 204.0° C. due to the heat generated by the reaction. The resin formed by the reaction, which has repeating structural units represented by the formula:

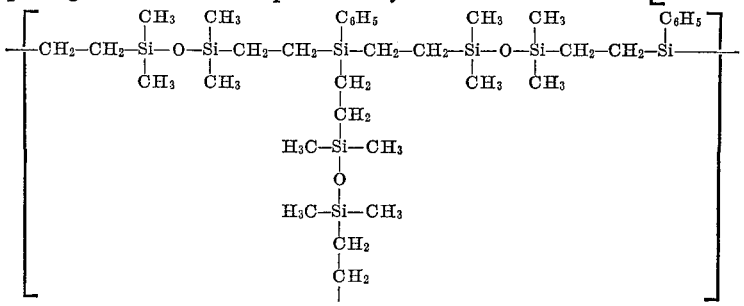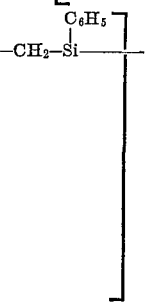

was removed from the vessel, treated with "Norit" and filtered. The filtrate was then vacuum heated to remove any low-boiling constituents. A 3.8 gram fraction boiling between 106° C. and 148.5° C. at 0.10–0.09 mm. Hg was removed by distillation leaving a residue of 31.8 grams of the organosilicon resin.

As will be observed from Examples I–III, a 2 to 3 molar ratio of silane to siloxane is employed in the reactions to maintain a chemical equivalency between the vinyl ($CH_2=CH-$) and silanic hydrogen (Si—H) bonds. Specifically, since there are two vinyl bonds in each mole of sym-tetramethyldivinyldisiloxane and three silanic hydrogen bonds on each mole of the organotrihydrosilane ($RSiH_3$), a quantity equivalent to three moles of the former is used for each two moles of the latter. The resin is formed by the addition of each of the hydrogen atoms on the silicon atom in the mono-trihydrosilane to the penultimate carbon atom in the vinyl group and the addition of the silicon atom in the mono-trihydrosilane to the penultimate carbon atom in the vinyl group and the addition of the silicon atom in the mono-trihydrosilane to the terminal carbon atom of the dialkenylsiloxane as illustrated below:

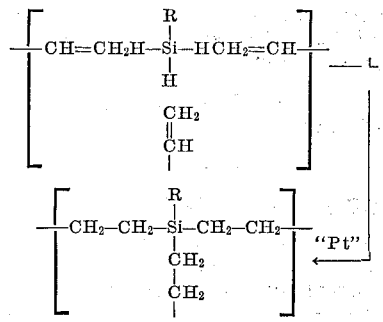

The organosilicon resin compositions of the present invention are particularly useful as encapsulating materials for electronic components.

While the reactions described in Examples I–III have employed a platinum catalyst, the hydrosilation reaction may be catalyzed by various techniques, including thermal, photochemical, radio chemical, free radical catalysis, and with various other metallic catalysts, though platinum catalysis is preferred.

While rather specific terms have been used in describing several embodiments of the invention, they are not intended, nor should they be construed as a limitation upon the invention as defined by the following claims.

I claim:

1. Organosilicon resin compositions having repeating structural units represented by the structural formula:

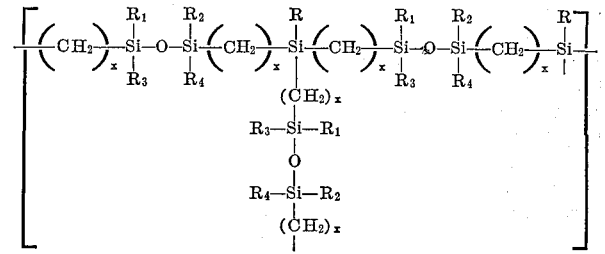

where R is selected from the group consisting of alkyls having from 1 to 30 carbon atoms, inclusive, cycloalkyls, aryls, arylalkyls, and carbalkoxy substituted derivatives thereof; $R_1$, $R_2$, $R_3$ and $R_4$ are each selected from the group consisting of alkyls having from 1 to 18 carbon atoms, inclusive, cycloalkyls, aryls and arylalkyls, and $x$ is an integer from 2 to 8, inclusive.

2. The organosilicon resin compositions of claim 1, wherein:

R is an alkyl group having from 1 to 30 carbon atoms; and $R_1$, $R_2$, $R_3$ and $R_4$ are each alkyl groups having from 1 to 18 carbon atoms, inclusive.

3. The organosilicon resin compositions of claim 1, wherein:

R is an aryl group; and $R_1$, $R_2$, $R_3$ and $R_4$ are each alkyl groups having from 1 to 18 carbon atoms, inclusive.

4. The organosilicon resin compositions of claim 1, wherein:
R is the phenyl group; and
$R_1$, $R_2$, $R_3$ and $R_4$ are each alkyl groups having from 1 to 18 carbon atoms, inclusive.

5. The organosilicon resin compositions of claim 1, wherein:
R is the phenyl group; and
$R_1$, $R_2$, $R_3$ and $R_4$ are all methyl groups.

6. The organosilicon resin composition of claim 5, wherein $x$ is 2.

7. The organosilicon resin compositions of claim 1, wherein:
R is the n-octadecyl group; and
$R_1$, $R_2$, $R_3$, and $R_4$ are all alkyl groups.

8. The organosilicon resin composition of claim 1, wherein:
R is the n-octadecyl group; and
$R_1$, $R_2$, $R_3$, and $R_4$ are all methyl groups.

9. The organosilicon resin composition of claim 8, wherein $x$ is 2.

References Cited

FOREIGN PATENTS

| | | | |
|---|---|---|---|
| 693,938 | 7/1953 | Great Britain | 260—46.5 |
| 938,715 | 10/1963 | Great Britain | 260—46.5 |

DONALD E. CZAJA, Primary Examiner

M. I. MARQUIS, Assistant Examiner

U.S. Cl. X.R.

204—159.13; 260—2, 448.2